Aug. 20, 1957   G. A. PAGE ET AL   2,803,485
EGG LIFTER
Filed May 23, 1955

INVENTORS
GEORGE A. PAGE
CLARENCE PAGE
BY
ATTORNEYS

2,803,485
EGG LIFTER

George A. Page and Clarence Page, Detroit, Mich., assignors to Page-Detroit, Inc., Southfield Township, Oakland County, Mich., a corporation of Michigan Application May 23, 1955, Serial No. 510,110

8 Claims. (Cl. 294—65)

The invention relates to the handling of eggs and has for its object the obtaining of a construction of manually operated suction lifter for conveniently and quickly removing the eggs from a celled carton or container in which they are stored. Such containers are of certain standard dimensions, the eggs being packed in tiers, and each tier having six rows of six eggs in each row or in some cases five rows of six eggs to the row. Our improved lifter is designed to simultaneously engage and lift all of the eggs in one tier and transfer them to the desired location. However, in the handling of eggs a certain amount of breakage is inevitable and the lifter must be of such character as to be operable where there are less than the full number of eggs in the tier. Also, if there are broken eggs which smear the lifter this must not render it inoperative. It is, therefore, the object of the invention to obtain a construction which is adapted to operate under the conditions just described.

To this end the invention consists in he construction as hereinafter set forth.

Figure 1:
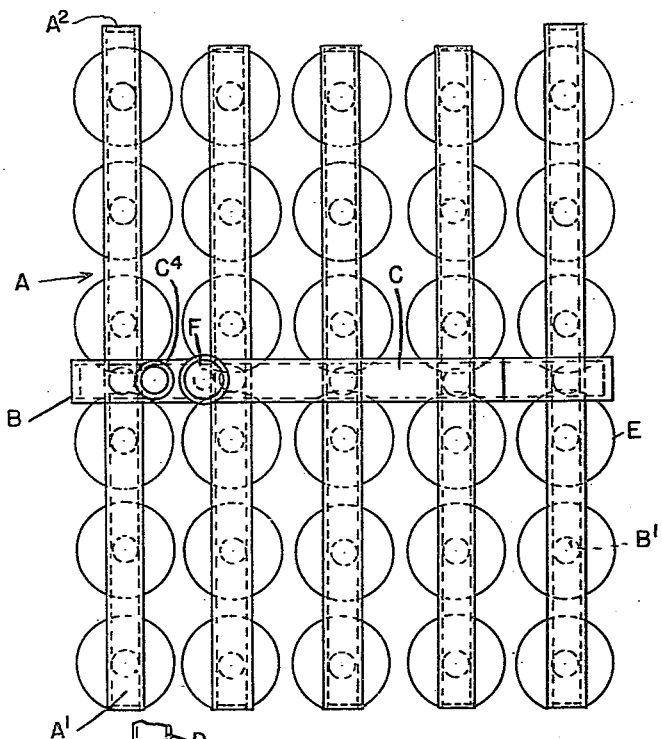
Fig. 1 is a plan view of our improved egg lifter.
Figure 2:
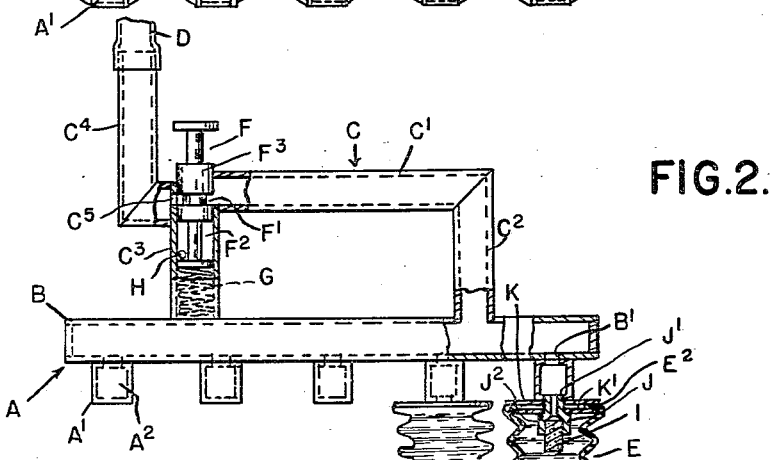
Fig. 2 is a side elevation partly in section.
Figure 3:
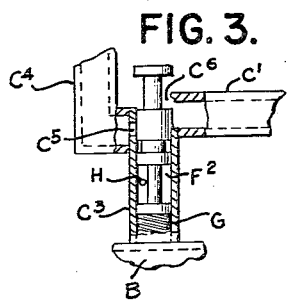
Fig. 3 is a similar view showing a different position of the valve.

As above stated our improved lifter is of the type where the individual eggs are held and lifted by suction. This requires vacuum or suction members located to register with the eggs in a tier and a handled frame on which said members are mounted, together with means for alternatively applying or destroying the suction. As shown in Fig. 1, the frame A comprises spaced tubes $A'$ positioned to register with the rows of eggs and of a length to cover all the eggs in each row. These tubes are preferably square in cross section and are closed at their opposite ends, as shown at $A^2$. B is a tube extending transversely across and above the tubes $A'$ at the center thereof, being rigidly attached thereto and communicating therewith through registering apertures $B'$. Above the tube B is a handle C of inverted U-shape formed of tube sections $C'$, $C^2$, and $C^3$ connected to each other and to the tube B. The sections $C'$ and $C^2$ form a vacuum connecting means for the tubes B and $A'$ and the tube $C'$ has at its opposite end an upwardly extending tube section $C^4$ for attachment to a flexible hose D extending preferably in a vertical direction to the source of vacuum. Depending from the tubes A are individual suction members E located in registration with all of the eggs of each row. Each member E forms a chamber which is open at its lower end and is provided with an annular flexible flange $E'$ for forming sealing contact with the upper end portion of each egg. As the eggs in each tier are not all of exactly the same height it is necessary that the members E should be automatically adjustable to compensate for this difference. This is preferably accomplished by making the members E of bellows form and of material sufficiently flexible to permit of axial collapsing. Thus, if the frame is pressed downward, each bellows will adjust itself to its individual egg so that when suction is applied all the eggs will be held and with sufficient force for the lifting of the same. For controlling the suction a valve F is provided between the tube section $C^4$ and $C'$ which latter are slightly out of alignment with each other, said valve being preferably housed in the section $C^3$. This valve is of the piston type, having a portion with an annular groove $F'$ therein through which in the normal position of the valve air can pass from the tube $C'$ through a registering port $C^5$ into the tube $C^4$. Below the piston is a spring G and a stop pin H engaging a groove $F^2$ in the piston limits the upward movement thereof. However, the piston may be pressed downward against the tension of the spring so that a portion $F^3$ thereof will close the port $C^5$ and by further movement will open a vent $C^6$ from the external atmosphere to the tube $C'$, the upper portion of the end of which is above the tubes $C^3$ and $C^4$. Thus, the operator grasping the handle C by one hand can at will depress the piston F by operation of a finger of the hand which will cut off the suction and will admit atmospheric pressure to the tubes $C'$, $C^3$, B and $A'$ and to the bellows E.

From the description just given it will be understood that suction is normally applied to all of the tubes $A'$ and to the bellows E so that when the frame is pressed downward over a tier of eggs with the sealing flanges $E'$ in contact therewith vacuum will be applied simultaneously to all permitting of lifting them from the cells of the carton and carrying them to the desired point for deposit. The operator may then release the eggs by depressing the valve F which admits air under atmospheric pressure and destroys the vacuum.

With the construction as thus far described it may be asked what would occur if some of the cells are empty of eggs so that the registering bellows are not sealed. This might admit sufficient air to the tubes to destroy the vacuum. To avoid such difficulty there is arranged between each bellows and the tube to which it is attached a restriction which limits the flow of air therethrough to a predetermined amount. This is sufficient so that a number of the bellows may be in free communication with the air without admitting sufficient air through the restrictions to destroy or objectionably limit the degree of vacuum in the tubes and in the bellows which are in use. Another question might be what would happen if an egg breaks and the fluid thereof is drawn into the suction system. This also must be guarded against, which we have accomplished as follows:

I is a filter in the form of a cylinder of small diameter which will permit the passage of a gas axially therethrough but will exclude liquids or solids. This filter is placed between the bellows E and the tube $A'$ to which it is attached and will limit the flow of air therethrough. The filter is detachably engaged with a socket member J, which latter forms a means of attaching the bellows to the tube $A'$. The member J has a threaded portion $J'$ of smaller diameter and a shoulder $J^2$ between the same and the larger portion. The portion $J'$ engages a threaded aperture in the bottom wall of the tube $A'$ and a pair of circular plates K and $K'$ apertured to engage the shank $J'$ are on opposite sides of an inturned annular flange $E^2$ at the upper end of the bellows E. Thus, the member J when screwed into the tube $A'$ will simultaneously clamp the plates K and $K'$ between the shoulder $J^2$ and said tube, attaching the bellows. The filters I are replaceable so that if at any time one becomes clogged, as for instance by a broken egg, it can be quickly detached and replaced by another filter.

The inturned annular flange $E'$ at the lower end of the bellows forms an effective seal with the egg and the pressure of the egg thereagainst caused by the suction will tend to radially contract the flange, insuring a perfect seal.

In use the lifter can be easily positioned with the bellows thereof in registration with the eggs, for the space tubes A' and transverse tube B form a skeleton frame which does not obstruct vision of the depending bellows members. Suction is normally communicated to the tubes B and A' and all of the bellows depending therefrom. Consequently as soon as these bellows are contacted with the eggs a partial vacuum within each bellows will hold the egg thereto and support its weight. The eggs may then be transferred to the desired station, whereupon pressure on the valve F will admit air from the external atmosphere to the tubes and the bellows, releasing the eggs.

What we claim as our invention is:

1. In an egg lifter including a handled frame, suction members depending from said frame located for simultaneous registration respectively with the individual cells of an egg container, tubular connections to said suction members, a tubular connection to a source of vacuum, and valve means for alternatively connecting said tubular connections with said source of vacuum and with the external atmosphere; an open ended socket member and a detachable and replaceable filter therein, both located between each of said suction members and its tubular connection adapted to exclude passage therethrough of anything other than a gas and also limiting the rate of flow of the latter.

2. The construction as in claim 1 in which each of said depending suction members is a bellows open at its lower end and having an inturned flexible annular flange surrounding said opening for sealing engagement with the egg.

3. The construction as in claim 1 having a skeleton handled frame affording vision of the individual suction members during engagement thereof with the eggs.

4. The construction as in claim 3 in which said skeleton frame comprises spaced tubes respectively aligned with rows of egg holding cells, a supply tube extending transversely across and connected to the aforesaid tubes, and a handle connected with said transverse tube, said valve means being mounted on said handle and positioned to be operable by a finger of the hand grasping said handle.

5. The construction as in claim 1 provided with a socket in each suction member for receiving said filter and also having a restricted passage communicating with the suction.

6. The construction as in claim 1 in which said socket member is externally a shouldered screw and forms an attachment means for said bellows to said tubular connection leading thereto.

7. The construction as in claim 1 in which said socket member is externally a shouldered screw with a threaded portion engaging a threaded aperture in said tubular connection, a pair of plates held by the shoulder of said screw and a flange at the upper end of said bellows clamped between said plates to form a sealing connection therewith.

8. The construction as in claim 1 in which said filter is a cylinder insertable into and removable from said socket through the lower open end of said bellows to facilitate quick exchange of filters whenever one becomes clogged.

References Cited in the file of this patent

UNITED STATES PATENTS

| | | |
|---|---|---|
| 1,610,363 | Davis | Dec. 14, 1926 |
| 1,779,174 | Larsen | Oct. 21, 1930 |
| 1,987,336 | Powell | Jan. 8, 1935 |
| 2,658,789 | Tellier | Nov. 10, 1953 |
| 2,704,685 | Tyler et al. | Mar. 24, 1955 |

FOREIGN PATENTS

| | | |
|---|---|---|
| 150,256 | Australia | Feb. 23, 1953 |